United States Patent
Wakikawa et al.

(10) Patent No.: US 6,347,069 B1
(45) Date of Patent: Feb. 12, 2002

(54) OPTICAL PICKUP DEVICE AND PRODUCTION METHOD OF OPTICAL PICKUP DEVICE COMPONENTS

(75) Inventors: Masanao Wakikawa, Sakai; Toru Tanaka, Kobe; Kiyoshi Ishioka; Masanori Onishi, both of Hirakata, all of (JP)

(73) Assignee: Matsushita Electric Industrial Co, LTD (JP)

( * ) Notice: Subject to any disclaimer, the term of this patent is extended or adjusted under 35 U.S.C. 154(b) by 0 days.

(21) Appl. No.: 09/335,758

(22) Filed: Jun. 18, 1999

(30) Foreign Application Priority Data

Jun. 25, 1998 (JP) ............................................. 10-177916

(51) Int. Cl.[7] ............................................... G11B 17/30
(52) U.S. Cl. ...................... 369/219; 369/44.21; 369/249
(58) Field of Search ........................... 369/44.16, 44.15, 369/44.12, 44.14, 219, 44.22, 44.21, 249; 360/234.3, 114

(56) References Cited

U.S. PATENT DOCUMENTS 5,199,014 A * 3/1993 Homburg et al. ........ 369/44.15
5,264,968 A * 11/1993 Masunaga ................ 369/44.16
6,181,673 B1 * 1/2001 Wilde et al. ............. 360/234.3

* cited by examiner

Primary Examiner—David Hudspeth
Assistant Examiner—Kim-Kwok Chu
(74) Attorney, Agent, or Firm—Parkhurst & Wendel, L.L.P (57) ABSTRACT

An optical pickup device featuring reduced number of components and improved workability for achieving cost reduction and improved product quality. A base stand (4) is provided with a first guide section (8) and a second guide section (9) which stand upright from the base stand individually and can slidably engage with the first and second engagement portions (11, 12) provided on a mount base (3), respectively. This arrangement permits the base stand (4) having the guide sections (8,9) fixed thereon to be assembled directrly with the mount base (3) including an optical pickup thereon, resulting in simplified assembly operation and enhanced operation efficiency. Further, integral forming of the base stand (4) together with the first guide section (8) and the second guide section (9) into one body enables it to reduce the number of components, cut the production costs and improve the product quality

5 Claims, 8 Drawing Sheets

PRIOR ART

FIG. 8

PRIOR ART

OPTICAL PICKUP DEVICE AND PRODUCTION METHOD OF OPTICAL PICKUP DEVICE COMPONENTS

FIELD OF THE INVENTION

The present invention relates to an optical pickup device for use in an optical record/reproduction apparatus such as a compact disk player.

BACKGROUND OF THE INVENTION

In a compact disk, an information signal is recorded in a track continuously formed from an inside circumference to an outside circumference of the disk. In order to continuously reproduce the signal from the rotating disk, such an arrangement is required that an optical pickup mounted to the optical pickup device is adapted to move radially reciprocally over a base stand. For this, the base stand has a guide section disposed thereon for guiding the optical pickup radially of the compact disk whereas the optical pickup has an engagement portion which slidably engages with the guide section. Further disposed on the base stand is a drive means for reciprocally driving the optical pickup along the guide section. This optical pickup device is arranged as shown in FIGS. 7 and 8.

Figure 7:
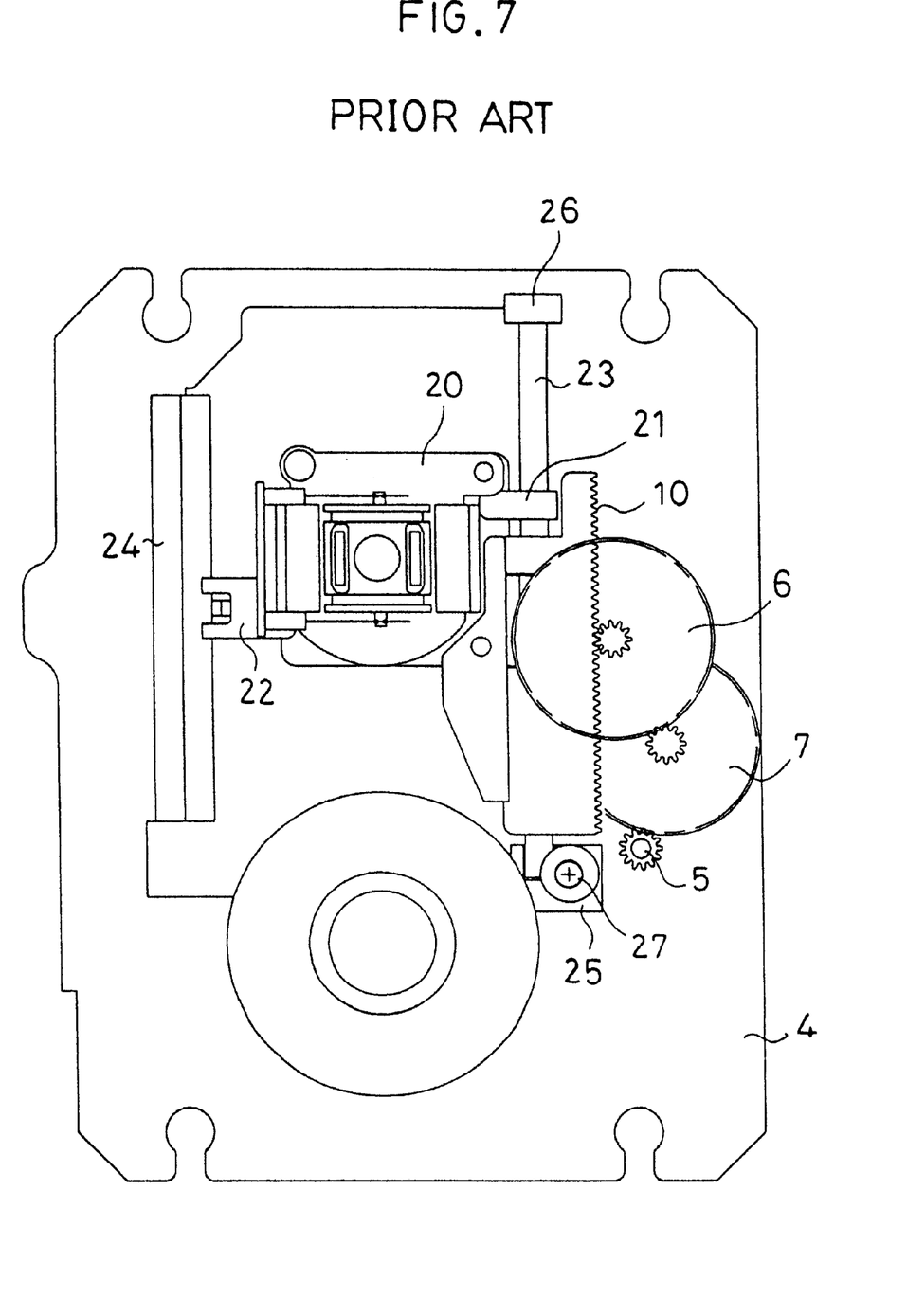
FIG. 7 is a plan view of a conventional optical pickup device.
Figure 8:
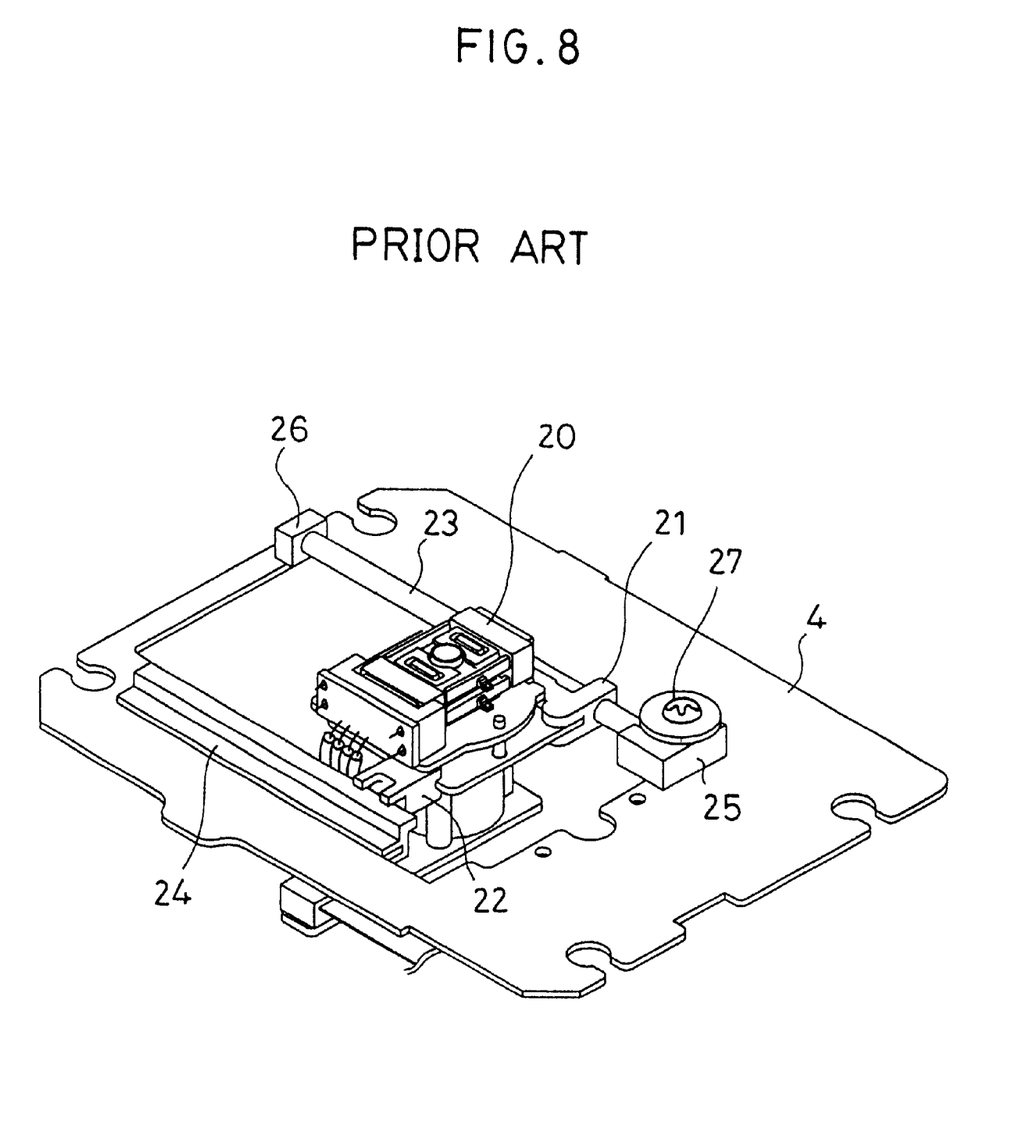
FIG. 8 is a perspective view of the conventional optical pickup device.

In FIGS. 7 and 8, a reference numeral 20 denotes the optical pickup; 5 the drive means for driving the optical pickup 20 radially of the compact disk (a drive shaft portion thereof is shown in FIG. 7); 4 the base stand; 10 a rack provided to the optical pickup 20; and 6 and 7 relay gears for reduction transfer of drive force to the rack 10. A guide shaft 23 is retained by retaining portions 25, 26 disposed on the base stand 4, and is fixed in position by means of a fixing screw 27. A guide section 24 extends on the base stand 4 in a parallel and opposed relation to the guide shaft 23. The guide shaft 23 extends through an engagement portion 21 of the optical pickup 20 whereas the guide section 24 is engaged with an engagement portion 22 of the optical pickup 20.

In this arrangement, the drive means 5 controlled by a servo circuit (not shown) causes, via the relay gears 6 and 7, the optical pickup 20 to reciprocate radially of a compact disk for reproducing a signal recorded in the compact disk.

More recently, a demand exists for compact disk reproduction apparatuses featuring even lower costs and higher reliability. Above all, there is a need for an optical pickup device of low-cost type, the device accounting for a particularly great cost ratio of the compact disk reproduction apparatus.

However, the conventional optical pickup device is arranged such that the guide shaft 23 extends through the engagement portion 21 of the optical pickup 20. Accordingly, the device is assembled in a manner that the guide shaft 23 penetrating the engagement portion 21 is firstly assembled to the retaining portions 25, 26 placed on the base stand 4 and then the retaining portion 25 is fixed in position by the fixing screw 27 for fixedly retaining the guide shaft on the base stand 4. This arrangement requires not only the base stand 4 provided with the retaining portions 25, 26 but also the guide shaft 23 and the fixing screw 27 for guiding the engagement portion 21 of the optical pickup 20. Hence, the large number of components are required and the assembly operation becomes complicated. This poses a problem that it is difficult to offer a low-cost optical pickup device.

SUMMARY OF THE INVENTION

In view of the foregoing, an object of the invention is to provide an optical pickup device featuring a reduced number of components and improved workability in order for realizing cost reduction and improved product quality.

For achieving the above object, an optical pickup device according to the invention comprises an object lens, an actuator for movably retaining the object lens, a mount base for tiltably retaining the actuator relative to an optical axis passing through a central portion of the object lens, a base stand on which the actuator and the mount base are mounted, a first guide section having a sectional form to stand upright from the base stand and extending along a radial direction of an optical disk for guiding the mount base radially of the optical disk, a second guide section having a sectional form to stand upright from the base stand and extending along the radial direction of the optical disk for guiding the mount base radially of the optical disk, a first engagement portion which provided on the mount base and adapted to engage with the first guide section for sliding along the radial direction of the optical disk, a second engagement portion provided on the mount base and adapted to engage with the second guide section for sliding along the radial direction of the optical disk, and drive means for reciprocally driving the mount base radially of the compact disk, characterized in that the mount base is arranged to move radially of the compact disk with the first and second engagement portions thereof being positioned to face an end of the first guide section and an end of the second guide section, respectively, so that the first and second engagement portions of the mount base can be brought into engagement with the first and second guide sections of the base stand.

This reduces the number of components and improves the workability, and thereby provide the optical pickup device featuring the reduced costs and improved product quality.

In a first aspect of the invention, the optical pickup device comprises an object lens; an actuator for movably retaining the object lens; a mount base for inclinably retaining the actuator relative to an optical axis passing through a central portion of the object lens; a base stand on which the actuator and the mount base are mounted; a first guide section having a sectional form to stand upright from the base stand and extending along a radial direction of an optical disk for guiding the mount base radially of the optical disk; a second guide section having a sectional form to stand upright from the base stand and extending along the radial direction of the optical disk for guiding the mount base radially of the optical disk; a first engagement portion which is provided at the mount base and engages with the first guide section for sliding movement radially of the optical disk; a second engagement portion which is provided at the mount base and engages with the second guide section for sliding movement radially of the optical disk; and drive means for reciprocally driving the mount base radially of the compact disk, wherein the mount base has a mountable arrangement in which the mount base is positioned to present its first and second engagement portions to an end of the first guide section and an end of the second guide section of the base stand, respectively, and moved radially of the compact disk for bringing the first and second engagement portions of the mount base into engagement with the first and second guide sections.

This arrangement permits the base stand with the first and second guide sections mounted thereon to be assembled together with the mount base, thereby simplifying the assembly operation.

In a second aspect of the invention, the optical pickup device according to the first aspect is characterized in that the first and second guide sections are integrally formed with the base stand into one body.

This arrangement contributes to reducing the number of components and dispenses with the step for attaching the first and second guide sections to the base stand. Thus, the assembly operation is further simplified.

In a third aspect of the invention, a production method of pickup device components for use in an optical pickup device, which include: a mount base for tiltably retaining an actuator; a base stand on which the actuator and the mount base are mounted; a first guide section having a sectional form to stand upright from the base stand and extending along a radial direction of an optical disk for guiding the mount base radially of the optical disk; a second guide section having a sectional form to stand upright from the base stand and extending along the radial direction of the optical disk for guiding the mount base radially of the optical disk; a first engagement portion provided on the mount base and adapted to engage with the first guide section for sliding radially of the optical disk; and a second guide section provided on the mount base and adapted to engage with the second guide section for sliding radially of the optical disk, wherein said method comprises the steps of: integrally forming all of the base stand having the first guide section and the second guide section mounted thereon, and the mount base provided with the first engagement portion and the second engagement portion, by using a same single mold; subsequently, separating said base stand and said mount base from each other; and obtaining the base stand integrally formed with the first and second guide sections, and the mount base integrally formed with the first and second engagement portions.

This method permits the base stand with the first and second guide sections and the mount base with the first and second engagement portions to be all formed at a time using a same single mold, whereby the production efficiency is improved. In this case, the components may be formed of a resin material or a sheet metal using the same single mold.

As described above, the arrangement of the invention is such that the first and second guide sections individually stand upright from the base stand, and the first and second engagement portions of the mount base are brought into slidable engagement with the respective guide sections, whereby the mount base provided with the optical pickup can be assembled directly onto the base stand having the guide sections fixed thereon. Hence, the assembly operation is simplified and the operation efficiency is enhanced. In addition, the number of components is reduced by integrally forming the first and second guide sections and the base stand into one body. As a result, the production cost is reduced and the product quality is improved.

PREFERRED EMBODIMENTS

The optical pickup device according to preferred embodiments of the invention will hereinbelow be described in detail with reference to accompanying drawings.

First Embodiment

Figure 1:
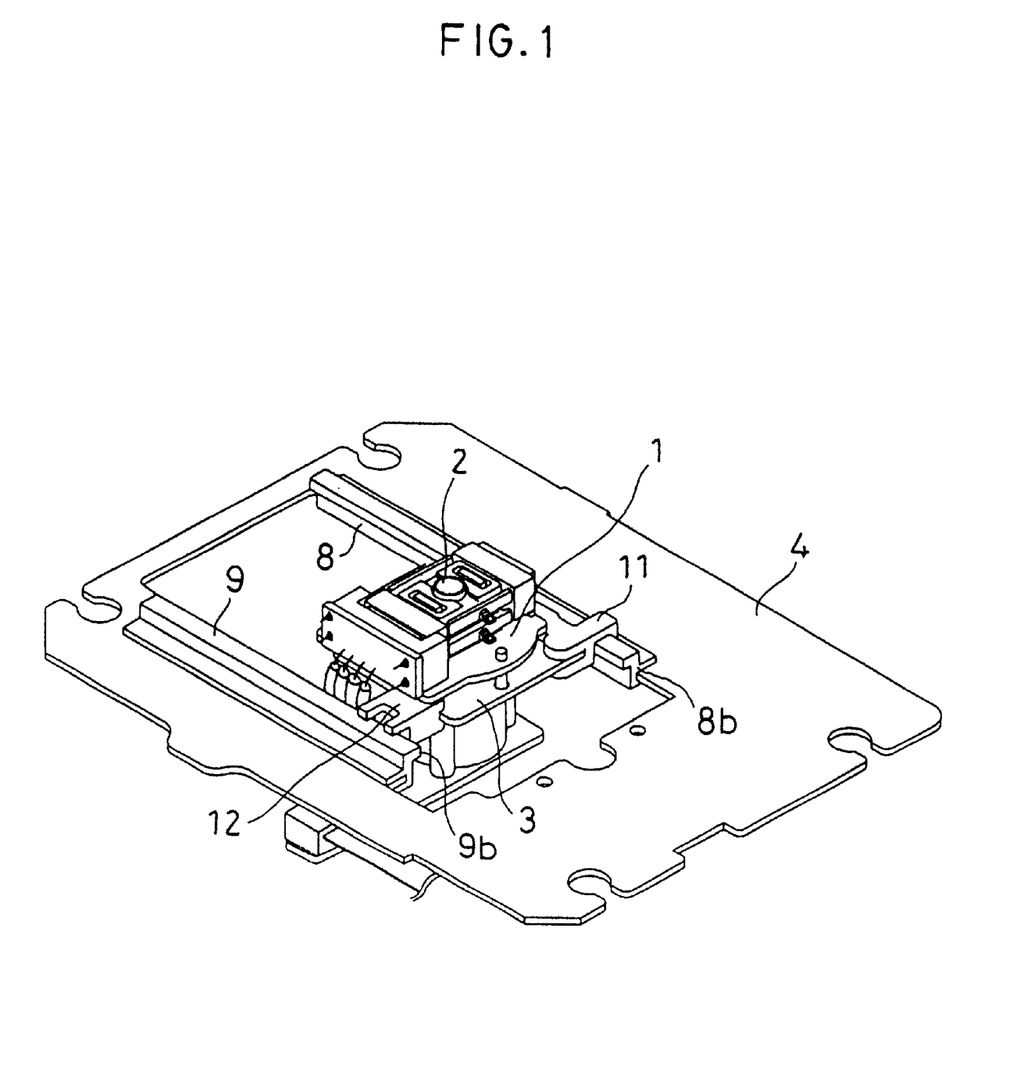
FIG. 1 is a perspective view of an optical pickup device with an optical pickup mounted on a base stand according to a first embodiment of the invention.
Figure 2:
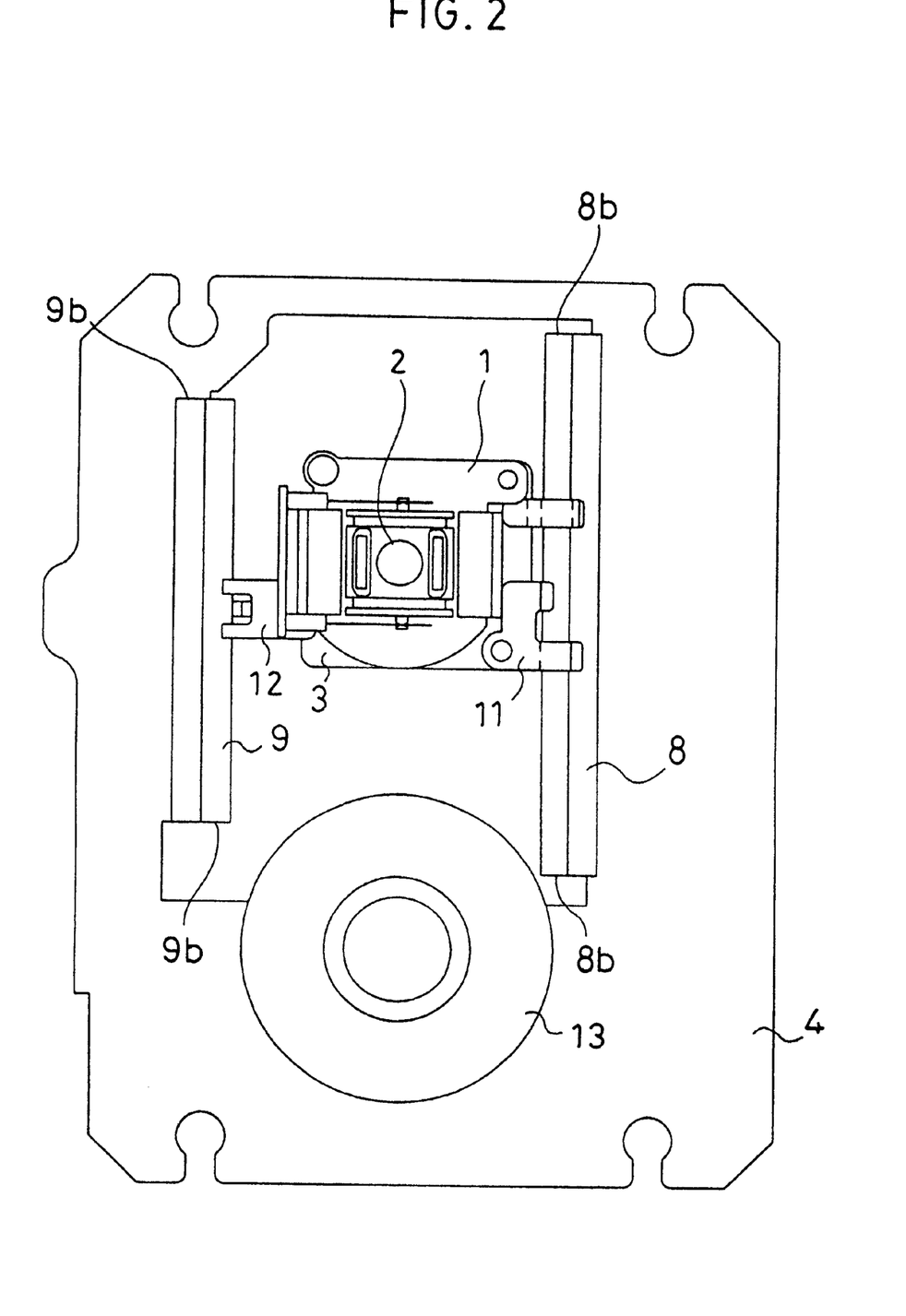
FIG. 2 is a plan view of the same optical pickup device.
Figure 3:
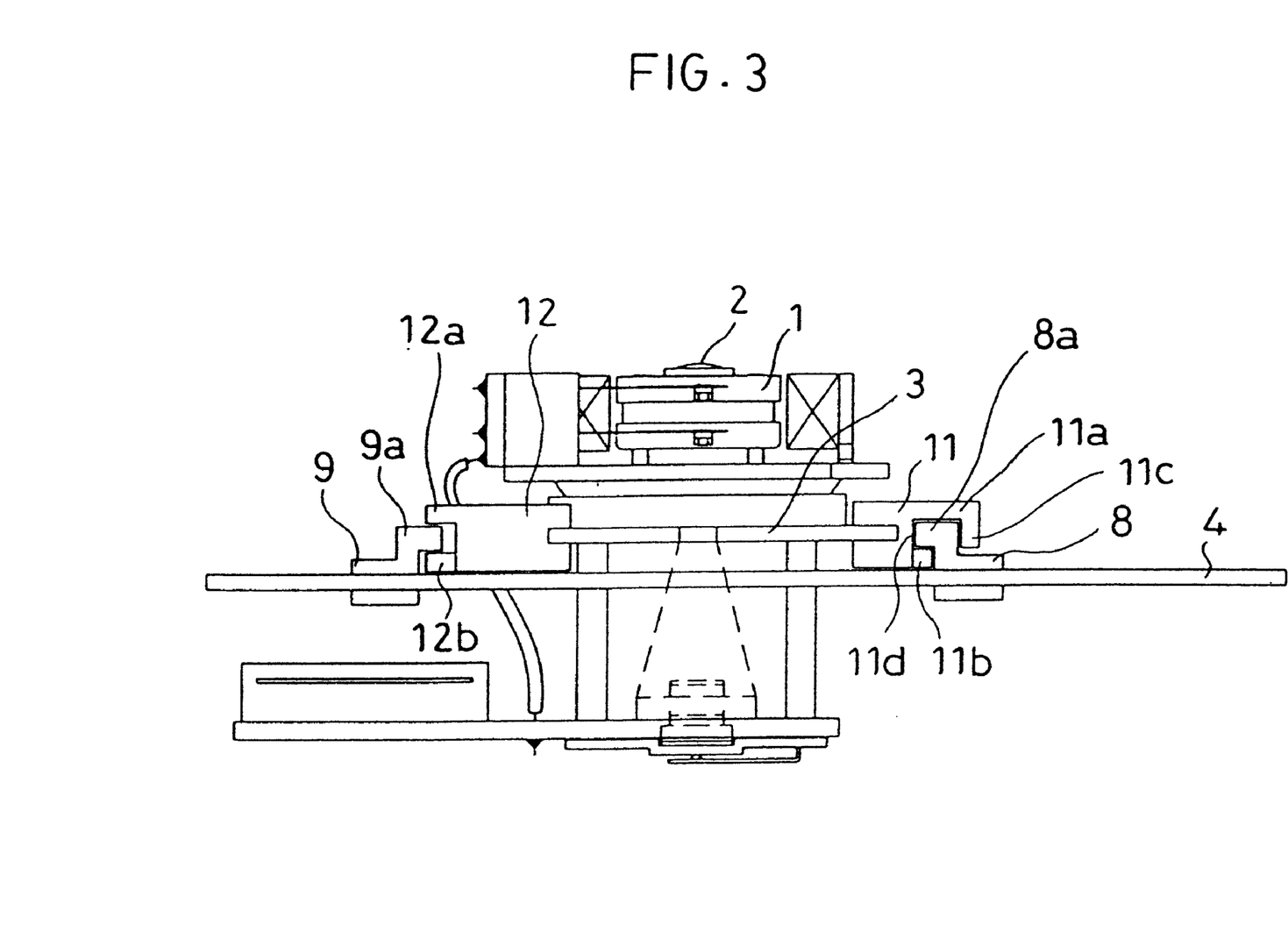
FIG. 3 is a side view of the same optical pickup device.
Figure 4:
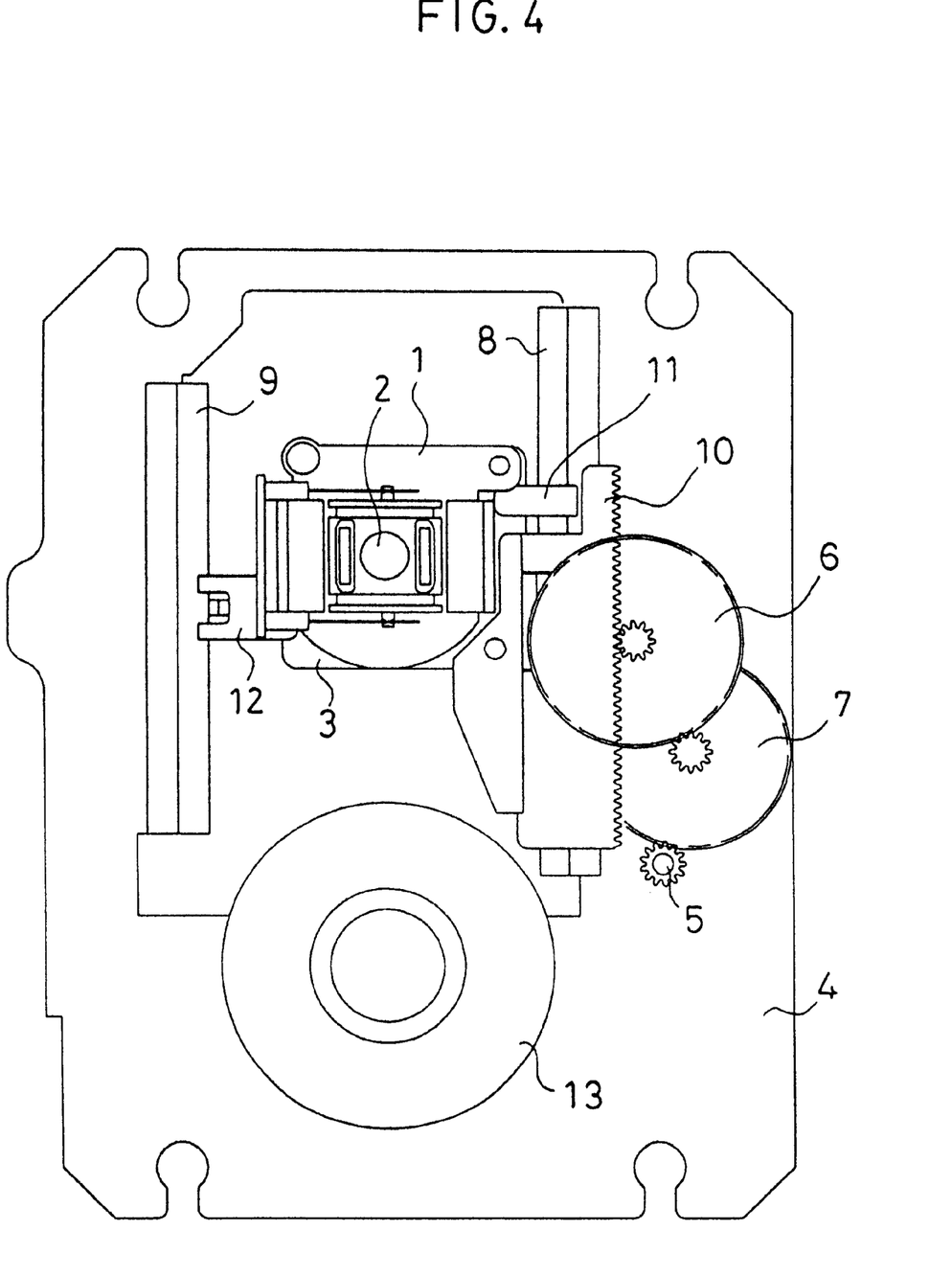
FIG. 4 is a front view showing a drive connection of the same optical pickup device.

FIGS. 1 and 2 illustrate an arrangement of an optical pickup device according to a first embodiment of the invention. FIG. 1 is a perspective view showing an optical pickup mounted onto a base stand; FIG. 2 a plan view of the same; FIG. 3 a side view of the same; and FIG. 4 a plan view showing a drive connection. Incidentally, portions having substantially the same functions as those of the conventional device are denoted by the same reference numerals, respectively.

Now referring to FIGS. 1 to 4, an actuator 1 movably retains an object lens 2 for reproducing a signal recorded in a compact disk as an optical disk. A mount base 3 tiltably retains the actuator 1 relative to an optical axis passing through a central portion of the object lens. On a base stand 4, there are mounted the mount base 3 carrying thereon the actuator 1, a drive means 5, and relay gears 6, 7. The drive means 5 operates to reciprocally drive the mount base 3 radially of the compact disk. A turntable 13 serves to rotate the compact disk.

The base stand 4 is provided with a first guide section 8 and a second guide section 9 in a parallel and opposed relation to each other. The first guide section 8 has a sectional form to stand upright by itself from the base stand 4 and extends along a radial direction of the compact disk for guiding the mount base 3 radially of the compact disk. The second guide section 9 has a sectional form to stand upright by itself from the base stand 4 and extends along the radial direction of the compact disk for guiding the mount base 3 radially of the compact disk. A rack 10 is attached to the mount base 3. The first guide section 8 is configured so that a sliding portion 8a having a rectangular section and located on the upper side thereof is adapted to slidably engage with upper, lower and lateral inside walls 11a to 11d of a first engagement portion 11 provided to the mount base 3. On the other hand, the second guide section 9 is configured so that a sliding portion 9a having a rectangular section and is located on the upper side thereof is adapted to slidably engage with upper and lower inside walls 12a, 12b of a second engagement portion 12 provided to the mount base 3. This permits the mount base 3 including the actuator 1 thereon to move over the base stand 4 radially of the compact disk.

Operations of the optical pickup device of the above arrangement will be described.

In this arrangement, when the drive means 5 such as a motor controlled by a servo circuit (not shown) is actuated, a drive force provided by the drive means 5 is transmitted to the rack 10 attached to the mount base 3 while being reduced via the relay gears 6, 7, whereby the mount base 3 holding the actuator 1 thereon is driven to reciprocate along the first guide section 8 and the second guide section 9 radially of the compact disk.

The engagement between the first guide section 8 and the first engagement portion 11 at this time is restricted as shown in FIGS. 2 and 3. In order to effect the restriction in a vertical direction relative to a compact disk surface on the mount base 3, the inside walls 11a, 11b of the first engagement portion 11 abut against the sliding portion 8a of the first guide section 8, and the inside walls 12a, 12b of the second engagement portion 12 abut agasint the sliding portion 9a of the second guide section 9. Further, the restriction in a circumferential direction of the compact disk, that is perpendicular to said vertical direction, is effected by means of the inside walls 11c, 11d of the first engagement portion 11.

On assembling the mount base 3 on the base stand 4, the mount base 3 is positioned so that its first and second engagement portions 11, 12 face an end 8b of the first guide section 8 and an end 9b of the second guide section 9, respectively, and is then moved radially of the compact disk, whereby the mount base 3 is readily assembled on the base stand 4.

That is to say, the first and second guide sections 8, 9 each have a self-supporting structure on the base stand 4, having no other components provided at their respective ends 8b, 9b, so that the assembly can be done by inserting the guide sections into the first and second engagement portions 11, 12. This permits the mount base 3 holding the actuator 1 thereon to be readily assembled on the base stand 4 unlike the prior art which requires the steps of assembling the guide shaft penetrating the engagement portion into the retaining portions, and fixing the retaining portions by means of a fixing screw.

The number of components is reduced by integrally forming the base stand 4 with the first and second guide sections 8, 9, so that the cost reduction is achieved. In addition, the step of mounting the first and second guide sections 8, 9 onto the base stand 4 is dispensed with, so that the assembly operation is further simplified, achieving improved operation efficiency and stable product quality. It is to be noted, however, that the embodiment should not be limited to the above arrangement and the first and second guide sections 8, 9 may be comprised of separate parts to be stuck onto the base stand. In this instance, as well, the advantage of easy assembly operation is provided.

Second Embodiment

Figure 5:
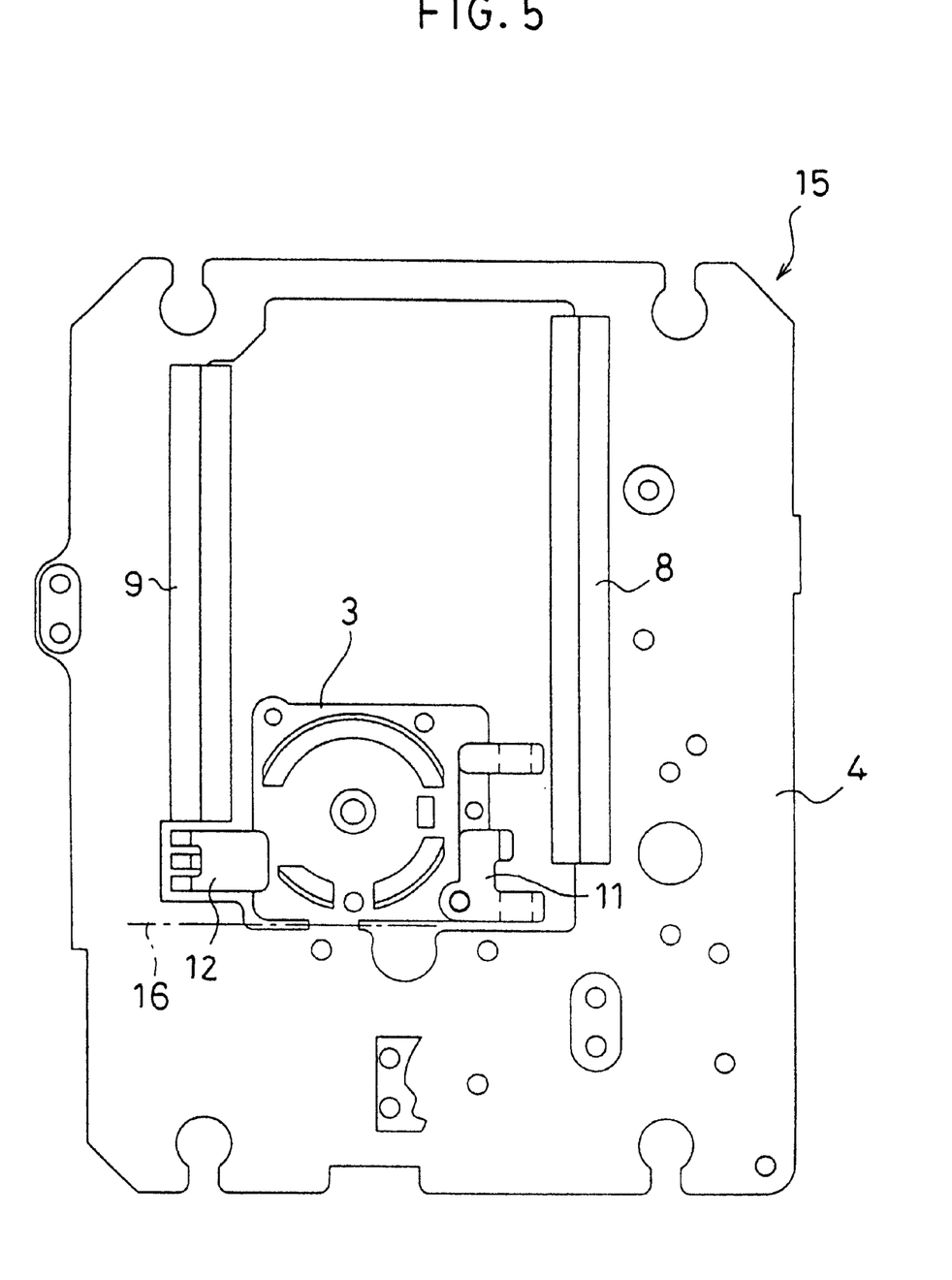
FIG. 5 is a plan view of an optical pickup device according to a second embodiment of the invention.
Figure 6:
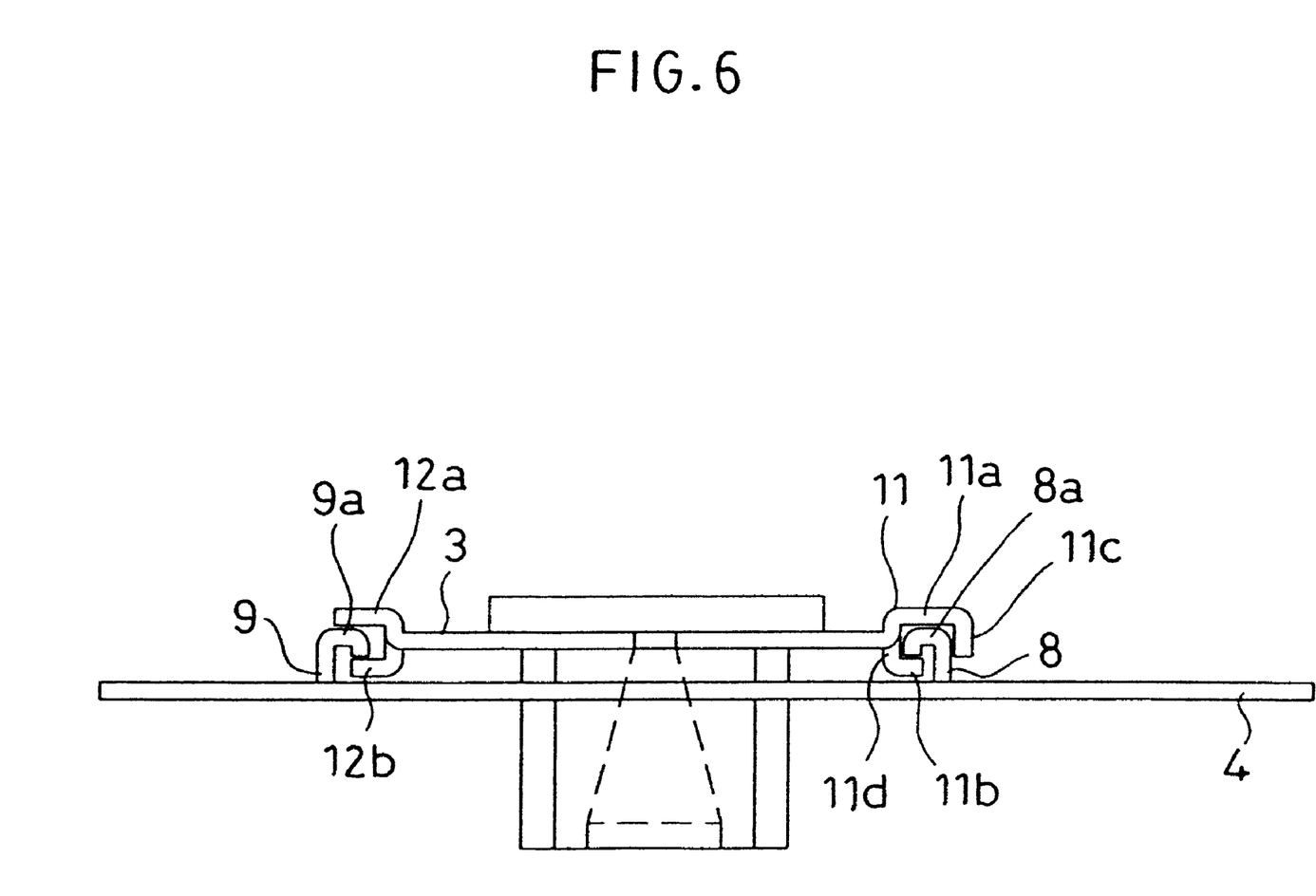
FIG. 6 is a side view of an optical pickup device according to another embodiment of the invention.

FIGS. 5 and 6 are plan and side views showing a base material component for use in the optical pickup device according to a production method of optical pickup device components according to a second embodiment of the invention.

As shown in FIGS. 5 and 6, the base stand 4 including the first and second guide sections 8, 9 thereon, and the mount base 3 including the first and second engagement portions 11, 12 thereon are integrally formed using a same single mold. Thus molded base material component 15 is separated into the base stand portion 4 and the mount base portion 3 by cutting along a cutting line 16, whereby the base stand 4 integrally formed with the first and second guide sections 8, 9 and the mount base 3 integrally formed with the first and second engagement portions 11, 12 are obtained.

In this case, the base material component may be formed of a resin material using the same single mold, as shown in FIG. 5, but the production method is not limited to this. As shown in FIG. 6, the base material component may otherly be formed of a sheet metal using the same single mold.

Thus, the base stand 4 and the mount base 3 may be formed as one component, reducing the number of forming steps. As a result, the production costs can further be reduced.

What is claimed is:

1. An optical pickup device comprising:
   an object lens;
   an actuator for movably retaining the object lens;
   a mount base for tiltably retaining said actuator relative to an optical axis passing through a central portion of the object lens;
   a base stand on which said actuator and mount base are mounted;
   first and second engagement portions on said mount base;
   a pair of parallel first and second guide sections extending along a radial direction of an optical disk, said first guide section independently upstanding from said base so that a rectangular portion located at an upper portion thereof includes opposing lateral sides for slidingly retaining said respective first and second engagement portions in a direction horizontally transverse to said radial direction and opposing top and bottom sides for slidingly retaining said engagement portions in a direction vertically transverse to said radial direction, said second guide section independently upstanding from said base so that a rectangular portion located at an upper portion thereof includes opposing top and bottom sides for slidingly retaining said engagement portions in a direction vertically transverse to said radial direction, said pair of guide sections having ends thereof unencumbered by support structure an d configured to engagingly receive said respective first and second engagement portions for guiding said mount base along the radial direction of the optical disk; and
   drive means for reciprocally driving said mount base radially with respect to the compact disk, characterized in that
   the mount base is arranged to move radially with respect to the compact disk with the first engagement portion and the second engagement portion being positioned to face an end of the first guide section and an end of the second guide section, respectively, so that the first engagement portion and the second engagement portion can be brought into engagement with the first guide section and the second guide section.

2. An optical pickup device as claimed in claim 1, wherein the first guide section and the second guide section are formed integrally with the base stand into one body.

3. A production method of optical pickup device components for use in an optical pickup device, said components including: a mount base for tiltably retaining an actuators; a base stand on which the actuator and the mount base are mounted;
   first and second engagement portions on said mount base;
   a pair of parallel first and second guide sections extending along a radial direction of an optical disk, said first guide section independently upstanding from said base so that a rectangular portion located at an upper portion thereof includes opposing lateral sides for slidingly retaining said respective first and second engagement portions in a direction horizontally transverse to said radial direction and opposing top and bottom sides for slidingly retaining said engagement portions in a direction vertically transverse to said radial direction, said second guide section independently upstanding from said base so that a rectangular portion located at an upper portion thereof includes opposing top and bottom sides for slidingly retaining said engagement portions in a direction vertically transverse to said radial direction, said pair of guide sections having an end thereof unencumbered by support structure and configured to engagingly receive said respective first and second engagement portions for guiding said mount base along the radial direction of the optical disk;

characterized in that said method comprises the steps of:

integrally forming all of the base stand with the first guide section and the second guide section, and the mount base with the first engagement portion and the second engagement portion by using a same single mold;

subsequently, separating said base stand and said mount base from each other; and obtaining the base stand integrally formed with the first guide section and second guide section, and the mount base integrally formed with the first engagement portion and second engagement portion.

4. A production method of optical pickup device components as claimed in claim 3, wherein the base stand provided with the first guide section and second guide section, and the mount base provided with the first engagement portion and second engagement portion are all formed of a resin material using the same single mold.

5. A production method of optical pickup device components as claimed in claim 3, wherein the base stand provided with the first guide section and second guide section, and the mount base provided with the first engagement portion and second engagement portion are all formed of a sheet metal using the same single mold.

* * * * *